July 7, 1964 J. C. ZIVNY 3,140,033

TAPE TENSION EQUALIZER

Filed Feb. 2, 1962

INVENTOR.
JOSEPH C. ZIVNY

BY

Carpenter, Abbott, Coulter & Kinney

United States Patent Office 3,140,033

Patented July 7, 1964

3,140,033

TAPE TENSION EQUALIZER

Joseph C. Zivny, Riverside, Ill., assignor to Minnesota Mining and Manufacturing Company, a corporation of Delaware Filed Feb. 2, 1962, Ser. No. 170,549
4 Claims. (Cl. 226—196)

Figures 1, 2:
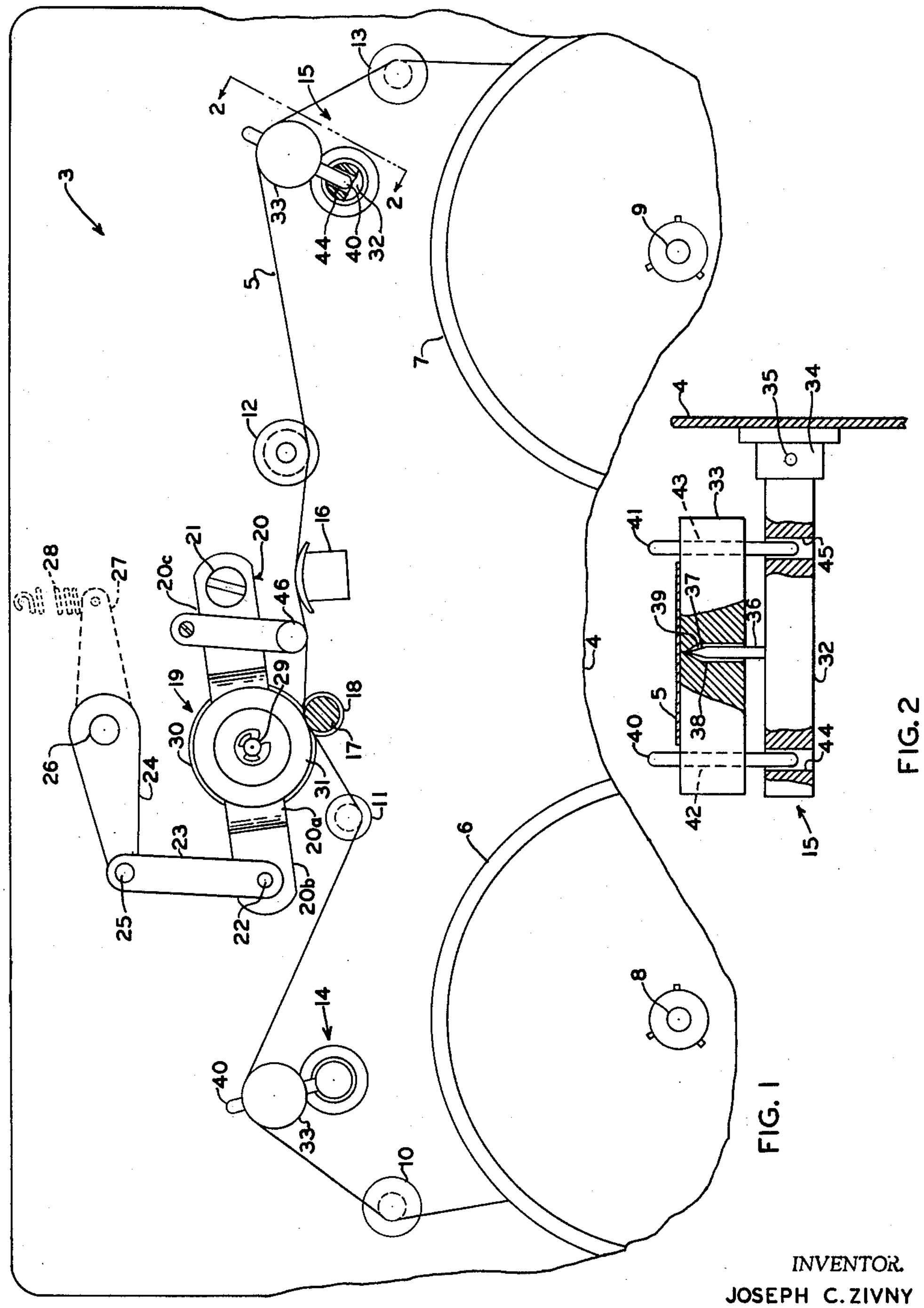

This invention relates to apparatus for handling relatively wide, thin-gauge tape of the character, for example, of magnetic recording tape, and it more particularly relates to improved means in such apparatus for equalizing or insuring uniformity in the tensile stresses occurring in the tape being handled by said apparatus.

The new thin-gauge wide tape, because of its flimsy nature, presents numerous handling problems which have not been previously presented in the use of thicker and narrower tapes. Non-uniformity of tension upon the thin-gauge wide tape causes improper tracking, misalignment, distortion and wrinkling of the edges, whereas with the thicker tapes, having more body, any misalignment could be corrected without damage to the tape by guide flanges engaging the edges of the tape.

When thin, relatively wide tape is not properly tensioned, it tends to become misaligned with the recording and/or play-back head, and tends to ride up the side flanges of the reels and guides with the result that the edges of the tape become wavy and worn, rapidly rendering the tape unusable. The condition of non-uniformity of tape tension usually results from the rollers and guides on the tape-handling apparatus not being precisely parallel. This lack of parallelism may be due to warpage occurring in the support plate or panel for said rollers and guides which, as a matter of economics takes the form of a stamping and not of a highly precision machined casting.

It is, therefore, an object of the present invention to provide a tension equalizer for use in apparatus for handling thin-gauge wide tape and adapted to maintain a uniform tension on the handled tape, thus preventing misalignment, distortion and wrinkling thereof.

A further object of this invention is to provide a tension equalizer of the aforementioned character which is self-adjusting in operating, simple in construction and readily fabricated by mass production techniques.

Other objects, features and advantages will become more apparent as the description proceeds, reference being had to the accompanying drawing wherein like numerals designate like parts:

FIGURE 1 is a diagrammatic elevational view of a magnetic tape recorder-reproducer embodying the present invention, and FIGURE 2 is an elevation view, partly in section, taken along the line 2—2 of FIGURE 1.

The present invention finds particular advantage when incorporated in a recorder-reproducer such as the type illustrated in FIGURE 1, used in conjunction with thin, wide magnetic tapes. This thin, wide tape referred to is a tape used to provide background music which tape has a normal thickness or gauge of approximately six ten-thousandths of an inch (0.0006″), a width of one inch (1″) and carries eighteen (18) laterally spaced longitudinally extending horizontal recording areas or sound tracks. With a tape of this nature, there is very little permissible lateral shifting.

Referring more particularly to FIGURE 1, the tape-handling apparatus illustrated therein takes the form of a recorder-reproducer generally designated by the numeral 3. The apparatus 3 comprises a mounting plate or panel 4 from which a pair of spindles 8 and 9 project, said spindles coaxially supporting a pair of reels 6 and 7 respectively. A recording medium, in this instance a thin, wide magnetic tape 5, is carried by the reels 6 and 7. In given instances either reel may be acting as the supply reel or take-up reel so are not specifically designated and suitable well-known reversible drive means (not shown) are provided for the spindles and reels.

The apparatus in FIGURE 1 further provides means defining a predetermined tape path extending between the reels 6 and 7, said means comprising a capstan 17, a conventional recording and/or play back head 16, and a series of flanged rollers or guide spools 10, 11, 12 and 13. The tape is also directed around a pair of tension equalizer assemblies generally designated 14 and 15, to be discussed more fully as this description proceeds.

Tape 5 is driven along the predetermined path past the head 16 by a suitable drive mechanism, only a portion of which is shown in the drawing. The tape drive mechanism comprises a capstan 17 projecting from the panel 4 and rotatively driven by suitable motor means (not shown). The capstan 17 is journalled in a bushing 18 carried by the panel 4 and may also be journalled at its outer end in a suitable bearing (not shown). The tape 5 is biased against the capstan 17, to be drivingly engaged thereby at a preselected constant rate, by a resilient pressure roller 30 forming part of a pressure roller assembly designated generally by the numeral 19.

The assembly 19 comprises a yoke-shaped member 20 having a rectangular intermediate frame portion 20*a* and oppositely directed lug portions 20*b* and 20*c*, the latter being pivotally connected to a cap screw 21 carried by the panel 4. The yoke member 20 supports an axle member 29 which has a resilient pressure roller 30, preferably of rubber, coaxially mounted thereon within the frame portion 20*a*. Mounted on the outer ends respectively of the axle 29, outboard of the frame portion 20*a*, are a pair of rigid rollers 31, only one of which is shown in FIGURE 1.

The lug portion 20*b* of frame 20 is pivotally connected as by a pin 22 to a link 23, which has its other end pivotally connected, as by a pin 25, to an arm 24 fixed onto a shaft 26. The shaft 26 is mounted in a suitable bearing and extends through the panel 4. On the other side of the panel 4 the shaft 26 has a second crank arm 27 fixed thereto. A helical spring 28 is suitably anchored at one end and has its other end connected to the arm 27. The spring 28 biases arms 24 and 27 and shaft 26 counterclockwise and through link 23 biases the yoke 20 counterclockwise about screw 21 to thereby bias the pressure roller 30 toward engagement with the back of the portion of the tape 5 engaging the capstan 17. The rigid rollers 31 have a diameter slightly smaller than the normal diameter of the pressure roller 30 and engage the capstan 17 adjacent the opposite edges of the tape 5. The rollers 31 tend to maintain the axle 29 in parallel relationship with respect to the capstan 17 irrespective of any inhomogeniety in the physical characteristics of the resilient roller 30, thereby tending to ensure that substantially uniform pressure is exerted on the tape 5 by the roller 30 throughout the length of said roller.

As illustrated, a snubber 46 may be carried by the yoke 20 on the lug portion 20*c* adjacent the head 16 to maintain the tape in engagement with said head. The snubber 46 may be adjustably secured to the lug portion 20*c* in any well-known manner permitting the proper placement of said member with respect to the head 16.

The tension equalizers 14 and 15 may be identical, so only one need be described in detail. As best shown in FIGURE 2 the illustrated tension equalizer 15 comprises a support member or stud 32 suitably mounted on and projecting normal to the panel 4 and a guide member 33 tiltably mounted on the stud 32. Both stud 32 and guide 33 are preferably cylindrical and the guide member 33 has a highly polished arcuate tape engaging surface portion adapted to engage the tape 5 transversely thereof.

Intermediate its length the guide member 33 has formed in the side thereof opposite its tape engaging surface a diametrical bore or recess 38 which terminates closely adjacent said tape engaging surface, for example, one thirty-second of an inch (1/32") therefrom. A round pin 36 is fixedly carried by and projects radially from the support 32 loosely into the bore 38 of guide member 33. The pin 36 has a tapered or conical end portion 37 which seats in tapered base 39 of the bore 38 providing substantially a point contact between the pin 36 and guide member 33 affording cardanic support for the latter. This support allows free tilting or pivotal movement of the guide member 33 about the pin 36 permitting said member to adjust its position under the bias of the tape 5 thereon as the tape is drawn over and around the arcuate tape engaging surface of said guide member. By such positioned adjustment the guide member 33 is continuously maintained in engagement with the tape 5 throughout the width of the tape. If the tape is riding tighter on one side or on one end of guide 33 than on the other, the guide will be tilted in a direction away from the tape on the tight side and correspondingly toward the tape on the loose side to a position in which the pressure exerted by the tape on the arcuate surface of pivoted guide 33 is equalized. This equalizes the tensile stresses throughout the width of the tape and thereby eliminates any tendency of the tape to ride out of or move laterally relative to the predetermined tape path. Further, this equalization of stresses eliminates any tendency of one edge of the tape to ride loose relative to the other tape guides. The location of the tip 37 of the pin 36 closely adjacent the tape engaging surface of guide member 33 insures that tilting movement of the guide member does not impart transverse movement to the tape.

Means is provided for limiting the pivotal or tilting movement of the guide member 33. In the illustrated embodiment of the invention, a pair of pins 40 and 41 are press-fitted through bores 42 and 43 extending diametrically through opposite end portions of the guide member 33 parallel with the bore 38. Corresponding ends of the pins 40 and 41 are loosely received in diametrical bores 44 and 45 respectively, formed in the stud 32 as shown which limit the pivotal or tilting and skewing movement of the guide member 33 to that sufficient to accomplish the objects of the invention. The upper ends of the pins 40 and 41 serve as edge guides for the tape and are particularly useful during threading of the machine.

As shown in FIGURE 1, the tension equalizing assemblies are preferably arranged with respect to the predetermined tape path in such a manner that the plane of the axes of the bores 44 and 45 (see also FIGURE 2) and of the support pin 36 substantially bisect the angle formed by the straight-line extents of the tape on the opposite sides of the guide members 33.

The tape thus tends to center the bore 38 about the pin 36 and to center the pins 40 and 41 with respect to the bores 44 and 45 respectively, thus allowing free movement of the guide member 33 about the point contact between the tip of the pin 36 and the base wall 39 of the bore 38. The positioning of the assembly, in the illustrated embodiment, may be adjusted to attain this centering relation by rotation of the stud 32 within an accommodating supporting sleeve 34 fixedly mounted on the panel 4. The stud 32 is then fixed in the adjusted position by a conventional set screw 35.

The equalization of tensile stresses within the tape 5 provided by equalizer 15 insures proper tracking as well as winding of the tape and prevents distortion, wrinkling and wear, thus insuring highly satisfactory performance and long tape life.

While the preferred embodiment of the invention has been illustrated and described, it will be understood that many changes in construction may be made within the scope of the appended claims without departing from the spirit of the invention.

What is claimed is:

1. In apparatus for handling relatively thin wide tape, tape tension equalizing means comprising a guide member having a surface adapted to engage the full width of said wide tape, which surface is arcuate in the lengthwise direction of the tape and has a straight dimension in the widthwise direction of the tape, and support means affording point contact with said guide member at one point intermediate said straight dimension thereof and affording cardanic support for said guide member.

2. In apparatus for handling relatively thin wide tape, tape tension equalizing means comprising, a cylindrical guide member having a smooth arcuate surface portion adapted to engage the full width of said tape transversely of the latter, said guide member being formed centrally with a substantially diametrical bore having a conical inner end wall closely adjacent said arcuate surface portion, and a fixed support pin of smaller diameter and greater length than said bore extending into said bore and having a tip portion engaging the inner end wall affording point contact therewith and providing cardanic support for said guide member.

3. In apparatus for handling relatively thin wide tape, tape tension equalizing means comprising, a fixed support member having a surface formed with two spaced recesses, an elongated cylindrical guide member positioned spaced from the surface of said support member and generally parallel to a line between said spaced recesses, said guide member having a highly polished arcuate surface portion adapted to engage the full width of said wide tape, said guide member being formed with a central diametrical bore having a conical inner wall closely adjacent said arcuate surface, a support pin projecting from the surface of said support member intermediate said spaced recesses and loosely received in said bore, said pin having a tip portion affording point contact with said guide member and providing a cardanic support for said guide member at the apex of said conical end wall, and limit pins carried by said guide member adjacent the ends thereof projecting radially therefrom parallel with said bore and extending loosely into said support member recesses respectively and cooperating therewith to limit the tilting movement of said guide member.

4. In apparatus for handling relatively thin wide tape, tape tension equalizing means comprising an elongated guide member having a smooth arcuate tape engaging surface that is flat in said elongated dimension, which dimension exceeds the width of the tape, said guide member being formed with a recess having a base wall in adjacent opposed relation with respect to said arcuate surface, and support means comprising a supporting pin extending loosely into said recess, said pin having a tip portion engaging said base wall to afford point contact with said guide member closely adjacent said arcuate surface and to afford cardanic suspension of said guide member intermediate the elongated dimension of said guide member.

References Cited in the file of this patent

UNITED STATES PATENTS

| | | |
|---|---|---|
| 1,240,631 | Trier | Sept. 18, 1917 |
| 2,894,702 | Heath | July 14, 1959 |

UNITED STATES PATENT OFFICE

CERTIFICATE OF CORRECTION

Patent No. 3,140,033 July 7, 1964

Joseph C. Zivny

It is hereby certified that error appears in the above numbered patent requiring correction and that the said Letters Patent should read as corrected below.

Column 1, line 44, for "operating" read -- operation --; column 3, line 11, after "in" insert -- the --; column 4, line 39, after "inner" insert -- end --.

Signed and sealed this 15th day of December 1964.

(SEAL)
Attest:

ERNEST W. SWIDER
Attesting Officer

EDWARD J. BRENNER
Commissioner of Patents